(12) United States Patent
Ziehl

(10) Patent No.: US 10,816,513 B2
(45) Date of Patent: Oct. 27, 2020

(54) WIRELESS DAMAGE ASSESSMENT DURING MANUFACTURING

(71) Applicant: University of South Carolina, Columbia, SC (US)

(72) Inventor: Paul Henry Ziehl, Irmo, SC (US)

(73) Assignee: University of South Carolina, Columbia, SC (US)

( * ) Notice: Subject to any disclaimer, the term of this patent is extended or adjusted under 35 U.S.C. 154(b) by 329 days.

(21) Appl. No.: 15/670,372

(22) Filed: Aug. 7, 2017

(65) Prior Publication Data

US 2018/0045688 A1   Feb. 15, 2018

Related U.S. Application Data

(60) Provisional application No. 62/372,898, filed on Aug. 10, 2016.

(51) Int. Cl.
| | |
|---|---|
| *G01N 29/44* | (2006.01) |
| *G01M 99/00* | (2011.01) |
| *G01N 29/04* | (2006.01) |
| *G01N 29/14* | (2006.01) |
| *G01N 29/24* | (2006.01) |
| *H04W 84/18* | (2009.01) |

(52) U.S. Cl.
CPC ...... *G01N 29/4409* (2013.01); *G01M 99/008* (2013.01); *G01N 29/04* (2013.01); *G01N 29/14* (2013.01); *G01N 29/2437* (2013.01); *G01N 29/2481* (2013.01); *G01N 2291/0231* (2013.01); *G01N 2291/0251* (2013.01); *G01N 2291/0258* (2013.01); *G01N 2291/2694* (2013.01); *H04W 84/18* (2013.01)

(58) Field of Classification Search
CPC ....... G01N 29/2481; G01N 2291/0231; G01N 2291/0251; G01N 2291/0258; G01N 2291/2694; G01N 29/14; G01N 29/2437; G01N 29/4409; G01N 29/04; H04W 84/18; G01M 99/008
See application file for complete search history.

(56) References Cited

U.S. PATENT DOCUMENTS

| | | |
|---|---|---|
| 6,996,480 B2 | 2/2006 | Giurgiutiu et al. |
| 7,024,315 B2 | 4/2006 | Giurgiutiu |
| 7,174,255 B2 | 2/2007 | Giurgiutiu et al. |
| 7,881,881 B2 | 2/2011 | Giurgiutiu et al. |

(Continued)

OTHER PUBLICATIONS

Musheng Yang et al., Research on wireless process data acquisition technology based on Agent in remote manufacturing, 2009 5th International conference on Wireless Communications, Networking and Mobile Computing, pp. 1-4, ISBN CD 978-1-4244-3693-4 (Year: 2009).*

*Primary Examiner* — Mischita L Henson
(74) *Attorney, Agent, or Firm* — Dority & Manning, P.A.

(57) ABSTRACT

A non-intrusive monitoring method and system for the detection and potential assessment of damage that may occur during a manufacturing process is described. Potential damage events such as impact events can be detected by one or more sensors located on a workpiece or on a machine utilized in the manufacturing process. Through wireless monitoring of the sensors, potential damage events are detected and products of the manufacturing process can be examined to determine if the event has led to damage.

20 Claims, 1 Drawing Sheet

(56) References Cited

U.S. PATENT DOCUMENTS

| | | |
|---|---|---|
| 9,158,054 B2 | 10/2015 | Giurgiutiu et al. |
| 9,523,606 B2 * | 12/2016 | Adda .................. G01N 21/274 |
| 9,581,570 B2 | 2/2017 | Caicedo et al. |
| 2008/0156096 A1 * | 7/2008 | Kollgaard .............. G01N 29/09 73/577 |
| 2008/0183403 A1 * | 7/2008 | Cipra .................. G01M 5/0025 702/34 |
| 2008/0288184 A1 | 11/2008 | Giurgiutiu et al. |
| 2009/0048789 A1 | 2/2009 | Yu et al. |
| 2010/0132469 A1 | 6/2010 | Giurgiutiu et al. |
| 2011/0259128 A1 | 10/2011 | Ziehl et al. |
| 2012/0280414 A1 | 11/2012 | Giurgiutiu et al. |
| 2015/0338380 A1 | 11/2015 | Ziehl et al. |
| 2017/0030863 A1 * | 2/2017 | Holmes ................ G01N 29/265 |
| 2017/0168021 A1 | 6/2017 | Van Tooren et al. |

\* cited by examiner

WIRELESS DAMAGE ASSESSMENT DURING MANUFACTURING

CROSS REFERENCE TO RELATED APPLICATION

This application claims filing benefit of United States Provisional Application Ser. No. 62/372,898 having a filing date of Aug. 10, 2016, which is incorporated herein by reference in its entirety.

BACKGROUND

The development of automated fabrication techniques in manufacturing has provided for decreasing labor costs as well as savings in energy and material utilization. Automated manufacturing has also provided improvements in quality, accuracy and precision. Unfortunately, increased automation has also produced some negative consequences. For instance, errors during manufacturing may be more likely to go unseen and undetected. For example, an unintended impact during manufacturing may degrade the component part and may go undetected, particularly in a highly automated manufacturing process. The resulting damage due to e.g., impact events, improperly functioning tools, etc. may not be visible in the final product and may not be reported even if noticed during a manufacturing process.

Acoustic emission technology has been successfully utilized in structural health assessment of devices and components for many years. In many instances acoustic emission has been used as a global screening method of structures (e.g., storage vessels), often followed with non-destructive examination methods such as ultrasonics when damage is detected or suspected. Acoustic emission screening has also been used within the aerospace industry for in-flight monitoring, during static testing, and for impact detection both in the air and on the ground. As one example, an anomaly related to debonding of cryogenic insulation in the Delta Clipper Advanced Experimental Vehicle was detected through acoustic emission monitoring.

What is needed in the art are automated systems and methods that can monitor a manufacturing process and provide information with regard to potential damage due to impact or other damage producing events. Moreover, a wireless system that can provide automated monitoring during fabrication with minimal impact to the fabrication process would be of great benefit.

SUMMARY

Aspects and advantages of the invention will be set forth in part in the following description, or may be obvious from the description, or may be learned through practice of the invention.

In one embodiment disclosed is a method for monitoring a manufacturing process for potentially damaging events. The method can be an automated method that can acoustically monitor for events that can indicate potential damage to a workpiece and/or to a tool (e.g., a robot) utilized during the manufacturing process. More specifically, a method can include wirelessly acquiring data from an acoustic emission and/or piezoelectric sensor system during a manufacturing process. An sensor (e.g., an acoustic emission sensor or a piezoelectric sensor) can be temporarily or permanently located on a workpiece such as a composite barrel section of an aircraft that is being processed during the manufacturing process and/or can be temporarily or permanently located on a machine that is involved in the manufacturing process. For instance, sensors can be located on a fiber reinforced composite panel that is being shaped, manipulated, or otherwise worked upon in the course of a manufacturing process. In one embodiment, a sensor can be located on a tool, track, support, etc. involved in the manufacturing process.

Data obtained from a sensor can be processed and compared to a determinant valued. For instance, a determinant value can be a baseline value or alternately can be values that have been obtained through analytical or numerical models. Significant deviation between the data and the determinant value can indicate a potentially damaging event and can be utilized to trigger further inspection, e.g., non-destructive examination, of a workpiece and/or tools utilized during the manufacturing process.

Also disclosed is a system for monitoring a manufacturing process. For instance, a system can include one or more acoustic emission and/or piezoelectric sensors configured to be attached to a workpiece that is being processed during a manufacturing process and/or to a component (e.g., a machine) of the manufacturing process. A system can also include a data acquisition system and/or a processor in wireless communication with the sensor(s) that is configured to acquire, analyze and process data obtained from the sensors and thereby recognize a potentially damaging event during a manufacturing process.

These and other features, aspects and advantages of the present disclosure will become better understood with reference to the following description and appended claims.

BRIEF DESCRIPTION OF THE FIGURES

A full and enabling disclosure of the present invention, including the best mode thereof, directed to one of ordinary skill in the art, is set forth in the specification, which makes reference to the appended figures, in which.

DETAILED DESCRIPTION

Figure 1:
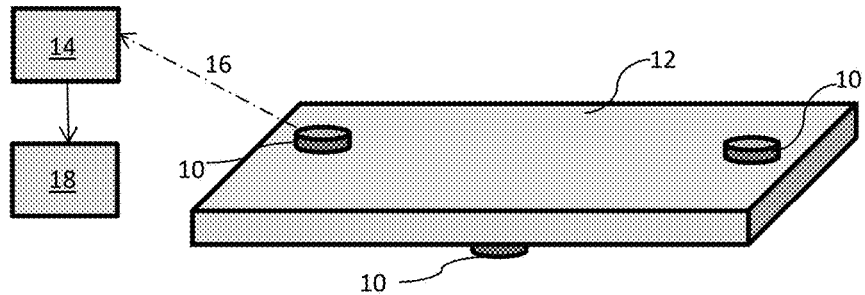
FIG. 1 schematically illustrates one embodiment of an acoustic monitoring system as disclosed herein.

It is to be understood by one of ordinary skill in the art that the present disclosure is a description of exemplary embodiments only, and is not intended as limiting the broader aspects of the disclosed subject matter. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present disclosure is generally directed to a non-intrusive monitoring method and system for the detection of damage that may occur during a manufacturing process. Potential damage events as may be detected by the system can include those that directly impact a workpiece being processed by a manufacturing process as well as those that can impact the manufacturing process itself, e.g., events that can damage a machine involved in the process, which can lead to defective products being produced by the process. By way of example, and without limitation, damaging events as may be detected by a system can include impact events due to, e.g., tool drops and/or rolling impacts, changes in the acoustic signature of machinery during manufacturing that can indicate damage to the machinery and/or the workpiece, etc. Damage as may be detected by a system can include flaws or defects within or along the surface of a workpiece that could adversely affect the performance of the product such as, without limitation, delamination, matrix cracking, disbonds (e.g., between a frame and reinforcing members or honeycomb composites), discontinuities, voids, porosity, etc.

Beneficially, a monitoring system can utilize one or more sensors that can accurately communicate potentially damaging events wirelessly to data storage and/or processing systems. For instance, sensors can include acoustic emission sensors and/or piezoelectric sensors. As the system can wirelessly provide continuous monitoring, it can have a low impact in the manufacturing environment as there can be few or no additional wires/cables, etc. to incorporate into the manufacturing process. The ability to communicate data wirelessly and to correctly interpret the data makes disturbance evaluation (e.g., acoustic emission evaluation and/or mechanical stress evaluation) as described feasible for a large variety of manufacturing environments.

According to the monitoring process, one or more sensors connected to an external transmitter (referred to as wireless emission sensors) or alternately including an integral transmitter (also referred to as wireless emission sensors) can be strategically placed on a workpiece and/or on a machine involved in a manufacturing process to provide for monitoring at any point in the manufacturing process and/or throughout all or a portion of the manufacturing process. Potentially damaging events can be detected by the sensor(s) and data can be communicated wirelessly to processors, storage devices, etc. for real time and/or future interpretation.

Beneficially, the monitoring can be carried out with extreme sensitivity to potentially damaging events, which can allow for relatively sparse sensor arrays and little interference with normal operation of the monitored structure/process. The monitoring methods and systems hold potential to detect anomalies in a global sense as well as in a highly targeted sense during a manufacturing process.

As schematically illustrated in FIG. 1, a system can utilize one or more sensors 10 that can be embedded in or otherwise attached to a structure 12. In one embodiment, a monitoring method can be performed by use of a structural health monitoring system that utilizes passive emission sensors. A passive acoustic structural health monitoring system can monitor for acoustic emission in an area by use of a sensor that "listens" but does not adversely interact with the structure on which the sensor is mounted. A passive mechanical stress monitoring system can monitor for mechanical stress disturbances by use of a piezoelectric sensor that likewise dose not adversely interact with the structure on which the sensor is mounted. As such, the general health state of the structure and/or the local environment can be inferred from analysis of the response of the passive sensor(s) and the sensors can continually or periodically obtain information automatically with no additional input necessary (e.g., no need to interrogate the sensors).

The wireless system and method can be used to monitor any number of manufacturing processes incorporating multiple different types of structures in a variety of industries where detection of flaws or defects in or near a manufacturing process can be of benefit including in the aircraft, automotive, marine, or construction industries, just to name a few.

In one embodiment, a system can monitor a manufacturing process that incorporates polymeric composite materials, for instance fiber reinforced polymeric composite materials. The development of fiber-reinforced polymeric composite materials has been of great benefit in many fields as these materials can provide excellent strength characteristics and corrosion resistance at low weight. These materials have been of particular benefit in the transportation industry, where the ability to produce light weight, strong, and resistant polymer-based structures has greatly enhanced efficiency of vehicles and decreased both construction and operating costs, for instance in formation of the barrel sections of aircraft. Polymeric composite laminates have been particularly attractive in such applications due to their long life, light weight and high strength characteristics.

A polymeric laminate includes a plurality of stacked layers attached to one another. At least one layer of the polymeric laminate can include a fiber reinforced polymeric composition. For instance, a polymeric laminate can include one or more layers of fiber reinforced thermoplastic tapes, tows, sheets, etc. and/or one or more layers of fiber reinforced thermoset tapes, tows, sheets, etc. Of course, a polymeric laminate is not limited to only layers of fiber reinforced polymeric compositions and the laminate can include layers of other materials, including, for example, a layer of polymeric composition that is not fiber reinforced, a non-polymeric layer, discontinuous layers, etc.

A thermoplastic polymer of a fiber reinforced polymeric composition can be a high performance polymer that can exhibit high mechanical properties such as stiffness, toughness, and low creep that make them valuable in the manufacture of structural products such as vehicle shell structures. High performance thermoplastic polymers as may be included in a thermoplastic composition can include, for example, polyarylene sulfides, polyaryletherketones, polyetherimides, polycarbonates, polyamides, liquid crystal polymers, etc., as well as copolymers and combinations of polymers.

A polymer of a fiber reinforced polymeric composition can include one or more thermoset polymers as are generally known in the art. For example a fiber reinforced thermoset composition can include a matrix resin selected from one or more of an epoxide, a polyimide, a bis-maleimide, a polyphenol, a polyester, etc., or combinations thereof that, when fully cured, forms a crosslinked thermoset matrix.

The fibrous reinforcement of a composite may include one or more fiber types including, without limitation, polymer fibers, glass fibers, carbon fibers, metal fibers, natural fibers such as jute, bamboo, etc., basalt fibers, and so forth, or a combination of fiber types. For instance, the fibers may be chopped fibers, continuous fibers, or fiber rovings. For example, a composite prepreg as is known in the art can be used such as a continuous carbon fiber/epoxy resin, which is a common composite material used in polymeric laminates.

One example of a manufacturing process as can be monitored according to the disclosed methods can include the formation (e.g., molding, shaping, curing, cutting, etc.) of a panel, e.g., a polymeric laminate panel, and the attachment of the panel to additional components such as ribs, joints, conduits, etc. For instance, a manufacturing process can include the formation of an open box structure that includes a panel as one or more walls of the structure, e.g., multi-ribbed box structure as found on aircraft control surfaces, automobile doors, etc. The monitoring systems can be particularly beneficial when incorporated with manufacture of box-type structures (i.e., structures that include walls partially or completely surrounding an open area), as an acoustic-based sensing technology can be particularly effective with such structures. It should be understood, however, that a workpiece panel of a manufacturing process is not limited to a polymeric laminate panel, and other materials including, without limitation, plywood panels, metal panels, solid wood panels, inorganic composite panels (e.g., concrete), etc. are encompassed herein. Moreover, a manufacturing process is not limited to the formation of box-like structures, and other manufacturing processes are encompassed herein.

Referring again to FIG. 1, a manufacturing process can include attachment of at least one sensor 10 to a structure 12. The structure 12 can be a workpiece of the manufacturing process, e.g., a panel as discussed above. A sensor 10 can be temporarily or permanently attached to a structure 12. For instance, a sensor 10 can be attached to a structure in an early step of a manufacturing process via a temporary adhesive and can be removed for re-use at a later time in the manufacturing process. Alternatively, a sensor 10 can be located on a workpiece in such a fashion that later recovery would be difficult or impossible (e.g., inside of an enclosed box), in which case the sensor can be permanently attached to the surface (or implanted in the surface) and can be left in the finished product. The sensor(s) 10 can be attached to an internal or external surface of the structure 12. For instance, a sensor 10 can be attached directly to a polymeric laminate with various fastening techniques, such as adhesives. A passive sensor 10 can be carried by a patch or an appliqué such that the sensor acquires data indicative of a specific portion of the structure 12.

Figure 2:
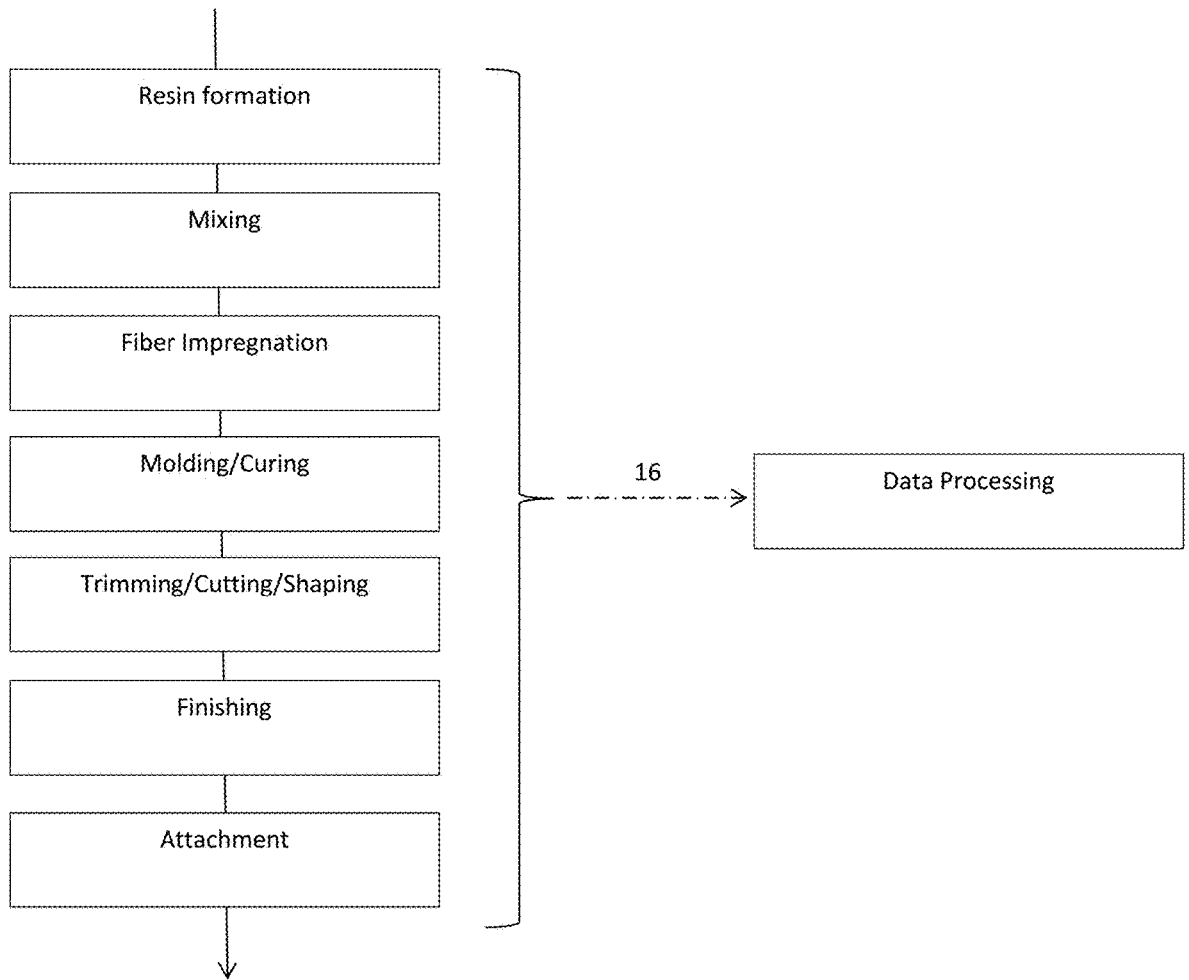
FIG. 2 is a flow diagram for one embodiment of a monitoring method as disclosed herein.

In one embodiment, the structure 12 can be a machine or device that is involved in the manufacturing process. FIG. 2 provides a flow diagram of one embodiment of a manufacturing process as may be monitored. In this particular embodiment, the manufacturing process can include the formation of a fiber reinforced polymeric composite followed by the attachment of the composite to other components of a final product. As such, the manufacturing process can include a number of operations including, but not limited to resin formation, mixing of the resin with additives (e.g., impact modifiers, colorants, etc.), fiber impregnation, and so on.

A sensor 10 can be attached to (or implanted in) one or more of the machines utilized in the manufacturing process and the sensor(s) can monitor the machine(s) for potentially damaging events that can affect product characteristics. By way of example, a manufacturing process can include a pultrusion step for fiber impregnation in formation of a polymeric composite. During a pultrusion process, a resin and continuous fibers (e.g., continuous glass or carbon fibers) are pulled together through a heated forming die. In such an embodiment, a sensor, e.g., an acoustic emission sensor, can be located on the forming die (e.g., at or near the exit of the forming die). During a manufacturing process, the sensor can monitor the forming die for potentially damaging events, e.g., impacts, changes in forming die acoustic signature, etc. that could indicate damage to the machine and as such damage to the nascent composite structure.

Manufacturing machines that can carry a sensor are not particularly limited. For example, and without limitation, sensors can be mounted on metering systems (e.g., for sealants, adhesives, etc.), pultrusion systems, extrusion systems, mandrels, molds, fiber handling machines (choppers, cutters, metering, etc.), wet-out equipment, ovens (e.g., curing ovens), saws, grinders, sheet metal fabrication machines, cutters, punches, welding machines, joining machines, automated fiber placement machines, etc.

A sensor 10 can be configured for acquiring data in response to potentially damaging events associated with the structure 12. A sensor 10 can be any suitable sensor or transducer capable of receiving an signal and transmitting or storing a response to that signal for communication with a data acquisition/processing system. Each sensor 10 is typically a non-destructive passive sensor, such that the sensor is capable of acquiring acoustic or mechanical data without interrogation and without harming the structure or requiring disassembly of the structure.

In one preferred embodiment, a sensor 10 can be a piezoelectric sensor. However, various other sensors may be employed with the system, such as through-transmission, shear-wave, resonance, or mechanical impedance sensors. Furthermore, the sensor 10 may be any number of sizes and configurations depending on a variety of factors, such as the size, configuration, or type of material of the structure 12, the type of sensor, and/or the type of events desired to be monitored.

While a sensor can provide multiple different types of information, a sensor 10 can primarily be utilized to recognize the occurrence of a potentially damaging event within or on the surface 12 and within the general area of the sensor 10. For instance, a single sensor 10 can be utilized to monitor about 2 linear feet or more, about 4 linear feet or more, or about 5 linear feet or more along the surface of a structure 12 in any direction from the sensor. In some embodiments, a single sensor 10 can monitor about 40 linear feet or less, for instance about 30 linear feet or less, or about 20 linear feet or less along the surface of a structure 12 in any direction from the passive sensor.

In some embodiments, a plurality of sensors 10 can be arranged on a surface 12, for instance in an array or grid. Depending upon the nature of the sensors 10 and the surface 12 (e.g., are the sensors permanently or temporarily attached to the surface, is the surface on a machine of a manufacturing process or on a workpiece, etc.), a system can include current paths or signal lines to and from each sensor 10, for example via wires the physically attached the sensors 10 to one another. The thus-formed network can serve to aggregate signals from sensors 10. In such an embodiment, the sensors can wirelessly communicate with a data acquisition system 14 with a single signal 16. Of course, separate wireless communication may extend between each respective sensor 10 and the data acquisition system 14 as well.

In conjunction with the passive sensor(s) 10, the system also includes a data acquisition system 14 capable of communicating with the passive sensor(s) 10 via a wireless signal 16 and a processing system 18 capable of communication with the data acquisition system 14. The data acquisition and processing systems 14, 18 are capable of providing information concerning a potential damaging event occurring to or near the structure 12 based on the data acquired by the passive sensor(s) 10 in response to the ambient events.

In one embodiment, the data acquisition system 14 can be carried with the sensor 10 on the surface. However, in other embodiments, the data acquisition and processing systems 14, 18 can be remote from the structure 12, which can decrease weight and space requirements of the system.

In one embodiment, the data acquisition system 14 can include a memory device by which data from a sensor 10 can be stored, and at a later time the memory device can be placed in communication with a processing system 18 to determine from the acquired data the occurrence and general location of a potentially damaging event. In other embodiments, the data acquisition system can be in constant communication with the sensor 10 and the processing system such that the structure 12 is capable of being continuously monitored by the sensor(s) 10 and potentially damaging events may be continually assessed.

Each passive sensor 10 is capable of communicating with the data acquisition system 16 and/or the processing system 18 wirelessly. For example, each sensor 10 can be capable of utilizing wireless technology, such as radio frequency emissions (e.g., via RFID, broadband, WiFi, Bluetooth®, Zigbee®, etc. communication) or other wireless techniques (e.g., via infrared communication) to communicate with the data acquisition system 16.

During use, a potentially damaging event at or near a passive sensor 10 can be detected by the sensor 10 (e.g., as a Lamb wave) and translated to an electrical current, which can then be stored as a digital value and/or communicated to the data acquisition system 14. In some embodiments, the time that the event occurred may also be stored. Typically, potentially damaging events can be indicated when the data of one or more sensors 10 varies from determinant values that can be obtained from baseline values (i.e., data acquired at the sensor under controlled conditions with no damaging events taking place) or that can be obtained through numerical or analytical simulations, with the variation typically being more than a predefined percentage or more than a predefined amount (in absolute terms). For example, if a detected event varies from a standard acoustic background level (as measured, e.g., in decibels) by about 10% or more, 15% or more, or 20% or more in some embodiments, a notification can be triggered that a potentially damaging event has occurred at or near that particular sensor.

In some embodiments, the system can gather additional data, such as information relating to the operating environment (e.g., temperature), maintenance (e.g., maintenance schedule or procedures), and/or specific characteristics of the structure (e.g., specifications). In those embodiments in which a sensor includes a data storage component, this component can be reset, i.e., the data erased, after the data is communicated to the data acquisition system, periodically, or at any other desired time.

The automation of data collection for a system can generally include two parts. A first hardware part can utilize an automatic signal switch box and a second software part can correspond to a control program. In an exemplary method of operation, digital control signals are generated by the software and sent to the switch box through a parallel port associated with a processor by way of a standard parallel cable. It should be appreciated, however, by those of ordinary skill in the art that other signal transfer methodologies and apparatus could be used, including, but not limited to, serial ports, infrared ports, USB ports, FireWire (IEEE 1394) ports, and wireless connections including WiFi and Bluetooth® technology. In addition, although reference is made herein to a computer and associated software, the use of such is not a specific requirement of the present subject matter as other devices including microprocessors, microcontrollers, application specific integrated circuit (ASIC) devices and other known devices may be employed to carry out the recited functions.

Upon recognition and detection of a potentially damaging event at the processing system 18, the particular location of the event within the manufacturing process can be noted and, depending upon the nature of the event and the process, the workpiece involved can be immediately pulled from the manufacturing process for further examination or can be flagged for later examination. In some embodiments, detection of a potentially damaging event can also cause the entire manufacturing process to be paused or halted, for instance in the event of a break-down of machinery or the like.

A monitoring system can optionally include a non-destructive examination device or system for further examination of a structure. Accordingly, following detection of a potentially damaging event by the sensor/data acquisition/processing system, a workpiece of the manufacturing process that may have been affected by the potentially damaging event can be further analyzed by use of, and without limitation to, ultrasonic techniques, magnetic-particle techniques, liquid penetrant techniques, radiographic techniques, eddy-current testing, low coherence interferometry, and so forth as well as combinations of techniques as is known in the art.

By way of example, an ultrasonic based nondestructive examination system as described in U.S. Patent Application Publication No. 2007/0074573 which is incorporated herein by reference can be utilized in conjunction with the monitoring system described herein. Briefly, a system can include a chassis in which there exists an array of feeler-carrier devices housing the ultrasonic transducers. The head can be coupled to a displacement system, for example, a machine of the moving-bridge type or of the moving-gantry type. This can provide sufficient degrees of freedom for ensuring coupling with a curved surface. The degrees of freedom can be achieved with rotations or tiltings and vertical movements made by elements of the chassis.

Through utilization of the system, all or part of a manufacturing process can be continually monitored for damage and specific information concerning the type, location and intensity of damage due to an ambient event. The improved monitoring can prevent production of damaged goods through detection and examination of potentially damaging events to workpieces of the manufacturing process as well as to machines utilized during the manufacturing process.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for monitoring a manufacturing process comprising:

in a manufacturing process, locating a wireless emission sensor on a workpiece, the wireless emission sensor comprising a passive sensor and a wireless transmitter in communication with the passive sensor;

modifying the workpiece in accord with the manufacturing process, wherein the manufacturing process includes multiple operations and the wireless emission sensor is retained on the workpiece throughout the multiple operations;

wirelessly transmitting data from the wireless emission sensor during each of the multiple operations of the manufacturing process, the data being transmitted to a data acquisition system;

communicating the data from the data acquisition system to a processing system, the processing system;

comparing the data from each of the multiple operations of the manufacturing process to a determinant value for each of the multiple operations of the manufacturing process and, based on the comparison, identifying a potentially damaging event to the workpiece during one of the multiple operations of the manufacturing process;

thereafter, removing the workpiece from the manufacturing process; and examining the removed workpiece by use of a non-destructive examination device or system.

2. The method of claim 1, wherein the determinant value is a baseline value.

3. The method of claim 1, further comprising obtaining the determinant value through numerical or analytical simulation.

4. The method of claim 1, wherein the workpiece comprises a fibrous reinforced polymeric laminate panel.

5. The method of claim 1, wherein the workpiece comprises a composite barrel section of an aircraft.

6. The method of claim 1, wherein the potentially damaging event is an impact or a change in an acoustic signature.

7. The method of claim 1, wherein the passive sensor is an acoustic emission sensor.

8. The method of claim 1, wherein the passive sensor is a piezoelectric sensor.

9. The method of claim 1, wherein the passive sensor is a single passive sensor in an organized array comprising multiple passive sensors, the method comprising wirelessly transmitting data from each of the multiple passive sensors during each of the multiple operations of the manufacturing process to the data acquisition system.

10. The method of claim 9, wherein the multiple passive sensors of the array are in wired communication with one another.

11. The method of claim 1, wherein the non-destructive examination device or system comprises ultrasonic based nondestructive examination.

12. A method for monitoring a manufacturing process comprising:

in a manufacturing process, locating a wireless emission sensor on a machine utilized in the manufacturing process, the wireless emission sensor comprising a passive sensor and a wireless transmitter in communication with the passive sensor;

sequentially modifying a plurality of workpieces by use of the machine in accord with the manufacturing process, wherein the wireless emission sensor is retained on the machine continuously as the plurality of workpieces are sequentially modified;

wirelessly transmitting data from the wireless emission sensor as each of the plurality of workpieces is modified in accord with the manufacturing process, the data being transmitted to a data acquisition system;

communicating the data from the data acquisition system to a processing system, the processing system comparing the data from each of the plurality of workpieces to a determinant value for the machine and, based upon the comparison;

identifying a potentially damaging event to the machine;

thereafter, pausing the manufacturing process; and examining the machine by use of a non-destructive examination device or system.

13. The method of claim 12 wherein the determinant value is a baseline value.

14. The method of claim 12, further comprising obtaining the determinant value through numerical or analytical simulation.

15. The method of claim 12, wherein the potentially damaging event is an impact or a change in an acoustic signature.

16. The method of claim 12, wherein the passive sensor is an acoustic emission sensor.

17. The method of claim 12, wherein the passive sensor is a piezoelectric sensor.

18. The method of claim 12, wherein the passive sensor is a single sensor in an organized array comprising multiple passive sensors, the method comprising acquiring data from the multiple sensors.

19. The method of claim 18, wherein the multiple sensors of the array are in wired communication with one another.

20. The method of claim 12, wherein the machine comprises a forming die, a metering system, a mandrel, a pultrusion system, an extrusion system, a fiber handling machine, wet-out equipment, an oven, a saw, a grinder, a welding machine, a joining machine, an automated fiber placement machine, or a robot.

* * * * *